United States Patent
Lee et al.

(10) Patent No.: US 8,467,086 B2
(45) Date of Patent: Jun. 18, 2013

(54) METHOD OF CONTROLLING SCALED-DOWN PRINTING FOR HOST DEVICE AND THE HOSE DEVICE USING THE METHOD

(75) Inventors: Sung-myun Lee, Seoul (KR); Young-joo Lee, Seoul (KR); Mi-kyung Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 359 days.

(21) Appl. No.: 12/539,042

(22) Filed: Aug. 11, 2009

(65) Prior Publication Data

US 2010/0073693 A1  Mar. 25, 2010

(30) Foreign Application Priority Data

Sep. 25, 2008 (KR) .................................. 2008-94266

(51) Int. Cl.
*G06K 15/02* (2006.01)
(52) U.S. Cl.
USPC ............ 358/1.2; 358/1.13; 382/298; 382/286
(58) Field of Classification Search
USPC .................. 382/286, 298, 276; 358/1.13, 1.9, 358/1.18, 1.2, 451, 3.27
See application file for complete search history.

(56) References Cited

U.S. PATENT DOCUMENTS

| | | | | |
|---|---|---|---|---|
| 5,020,115 A * | 5/1991 | Black | ............................ | 382/298 |
| 5,608,824 A * | 3/1997 | Shimizu et al. | ............... | 382/276 |
| 6,515,767 B1 * | 2/2003 | Sakurai | ........................... | 358/1.9 |
| 6,628,424 B2 | 9/2003 | Sakurai | | |
| 7,123,367 B1 * | 10/2006 | Kanaya et al. | ............... | 358/1.13 |
| 7,564,594 B2 * | 7/2009 | Shoki | ............................ | 358/451 |
| 8,009,929 B2 * | 8/2011 | Sakurai | ........................ | 382/286 |
| 8,018,618 B2 * | 9/2011 | Ishibashi | ...................... | 358/1.18 |
| 2003/0174354 A1 * | 9/2003 | Oteki | ............................ | 358/1.13 |
| 2005/0038703 A1 * | 2/2005 | Toki et al. | ........................ | 705/14 |
| 2005/0259275 A1 * | 11/2005 | Shoki | ............................ | 358/1.2 |
| 2007/0024874 A1 * | 2/2007 | Kawamura | .................... | 358/1.2 |
| 2007/0086055 A1 | 4/2007 | Ishibashi | | |
| 2009/0168109 A1 * | 7/2009 | Kishi | .......................... | 358/3.27 |

FOREIGN PATENT DOCUMENTS

| | | |
|---|---|---|
| JP | 1999-0045345 | 6/1999 |
| JP | 2007-114833 | 5/2007 |

OTHER PUBLICATIONS

Korean Office Action dated Jan. 3, 2013, issued in corresponding Korean Patent Application No. 10-2008-0094266.

* cited by examiner

*Primary Examiner* — David K Moore
*Assistant Examiner* — Ashish K Thomas
(74) *Attorney, Agent, or Firm* — Staas & Halsey LLP

(57) ABSTRACT

A method of controlling scaled-down (size-reduced) printing for a host device and the host device using the method, the method including inputting a scaling-down mode for the print document through a user interface (UI) of the host device; inputting a scaling-down rate fine adjustment for the scaling-down mode to generate a new scaling-down rate; and applying the new scaling-down rate to the print document. Thus, a user is provided with the convenience of obtaining a scaled-down print result that is not distorted.

19 Claims, 9 Drawing Sheets
(2 of 9 Drawing Sheet(s) Filed in Color)

Normal printing image 4-up printing image (49%scale)

ORIGINAL
BITMAP

ENLARGEMENT OF
PORTION OF
SCALED-DOWN BITMAP

DISTORTED
SCALING-DOWN
BITMAP

METHOD OF CONTROLLING SCALED-DOWN PRINTING FOR HOST DEVICE AND THE HOSE DEVICE USING THE METHOD

CROSS-REFERENCE TO RELATED APPLICATION

This application claims the benefit of Korean Patent Application No. 2008-94266, filed Sep. 25, 2008 in the Korean Intellectual Property Office, the disclosure of which is incorporated herein by reference.

BACKGROUND OF THE INVENTION

1. Field of the Invention

Aspects of the present invention relate to scaled-down (or size-reduced) printing, and more particularly, to a method of controlling scaled-down printing for a host device connected with an image forming apparatus that prints a scaled-down print document and the host device using the method.

2. Description of the Related Art

Image forming apparatus drivers provide a number of additional operations for user convenience during image printing performed by corresponding image forming apparatuses. For example, in order to save print media (such as paper, transparencies, etc.), most printer drivers provide an N-Up operation that allows several pages of a document to be printed on one sheet. However, a scaling-down (or size-reduction) process performed in the N-Up function causes a loss and/or a defect of an image.

Therefore, a user is inconvenienced by the loss or the defect of a scaled-down printed image.

SUMMARY OF THE INVENTION

Aspects of the present invention provide a method of controlling scaled-down (size-reduced) printing for a host device, in which a loss or defect of a scaled-down printed image is prevented as much as possible, thereby providing convenience to a user. Aspects of the present invention also provide a host device, in which a loss or defect of a scaled-down printed image is prevented, thereby providing convenience to a user.

According to an aspect of the present invention, there is provided a method of controlling scaled-down printing for a host device connected with an image forming apparatus that prints a print document, the method including: inputting a scaling-down mode for the print document through a user interface (UI) of the host device; inputting a scaling-down rate fine adjustment for the scaling-down mode to generate a new scaling-down rate; and applying the new scaling-down rate to the print document.

According to another aspect of the present invention, there is provided a host device connected with an image forming apparatus that performs scaled-down printing on a print document, the host device including: a user interface (UI) unit including a scaling-down mode input unit through which a scaling-down mode for the print document is input, and a scaling-down rate fine adjustment input unit through which a scaling-down rate fine adjustment to finely adjust a preset rate of the input scaling down mode is input; and a control unit to generate a new scaling-down rate from the preset rate and the input scaling-down rate fine adjustment, and to apply the new scaling-down rate to the print document.

According to another aspect of the present invention, there is provided an image forming system to perform scaled-down printing on a print document, the system including: a host apparatus comprising a user interface (UI) unit comprising a scaling-down mode input unit through which a scaling-down mode for the print document is input, and a scaling-down rate fine adjustment input unit through which a scaling-down rate fine adjustment to finely adjust a preset rate of the input scaling down mode is input; and an image forming apparatus to print the print document according to a new scaling-down rate generated from the preset rate and the input scaling-down rate fine adjustment.

According to yet another aspect of the present invention, there is provided an image forming apparatus that performs scaled-down printing on a print document, the image forming apparatus including: a user interface (UI) unit comprising a scaling-down mode input unit through which a scaling-down mode for the print document is input, and a scaling-down rate fine adjustment input unit through which a scaling-down rate fine adjustment to finely adjust a preset rate of the input scaling down mode is input; a control unit to generate a new scaling-down rate from the preset rate and the input scaling-down rate fine adjustment, and to apply the new scaling-down rate to the print document; and a printing unit to print the print document on a print medium.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects and advantages of the invention will become and more readily appreciated from the following description of the embodiments, taken in conjunction with the accompanying drawings of which.

DETAILED DESCRIPTION OF THE EMBODIMENTS

Figure 1:
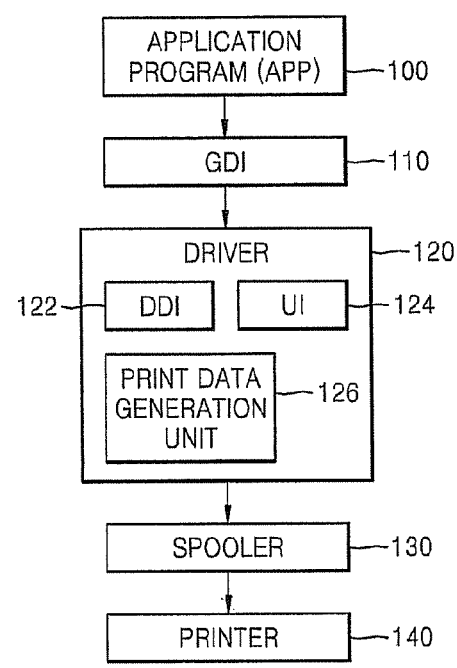
FIG. 1 is a diagram explaining a printing process performed by a printing system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram explaining a printing process performed by a printing system. Referring to FIG. 1, once a user creates a document in an application program (APP) 100 to generate a print file to be printed, the document is transmitted to a graphic device interface (GDI) 110. The GDI 110 may be installed during installation of an operating system of a host computer. The GDI 110 recognizes information about objects of the print file (such as Font, Graphics, Bitmap, Brush or Pattern, and/or Vector), and converts the recognized information into operation that is recognizable by a driver program (i.e., a device driver interface (DDI) operation). The user selects a desired print option through a user interface (UI) 124 of the driver 120 to issue a print command. Upon the issue of the print command, the GDI 110 transmits source data used for printing to the driver 120 through a DDI 122 of the driver 120. The print data generation unit 126 of the driver 120 generates print data that is recognizable by a printing device (such as a printer 140) based on the source data, and transmits the generated print data to the printer 140 through a spooler 130.

Examples of print data that are recognizable by a printing device include a printer control language (PCL) type, a printer description language (PDL) type, and a host-based type that generates an entire page image. The user can select, through the UI 124, options such as print resolution, paper size, paper type, duplex (or double-sided) printing, Scaled-Up/Down printing (or size-enlarged/size-reduced printing), N-Up printing to print several pages on a single sheet of print medium, and/or Fit-to-Page printing to print a print file to fit a print medium size.

When the user selects scaled-down printing or N-Up printing, the print data generation unit 126 transmits a scaling-down rate (or a reduction rate) to the printer 140. Accordingly, firmware (F/W) in the printer 140 performs scaling down or a driver of a host-based printer scales down the entire page image.

Figure 2:
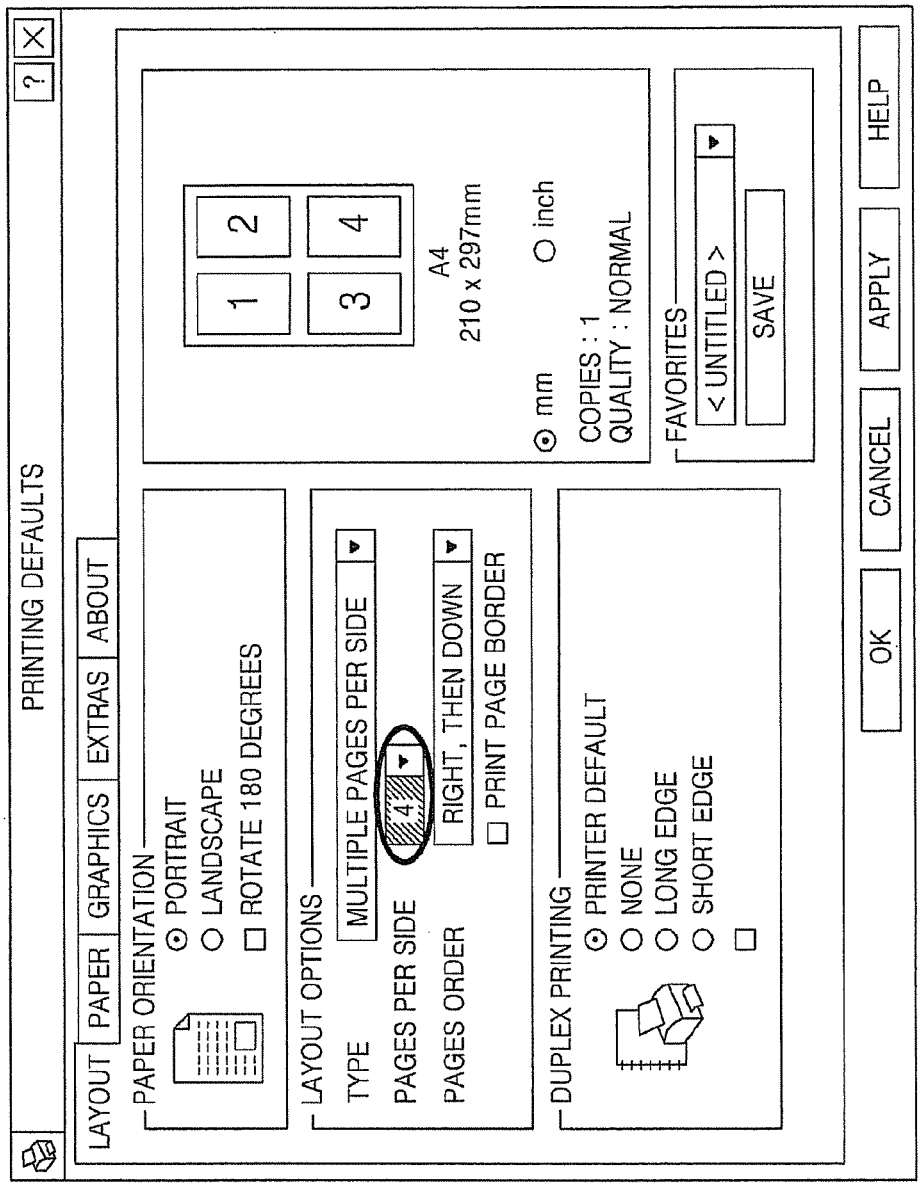
FIG. 2 illustrates a user interface (UI) screen in which 4-Up printing is selected.

FIG. 2 illustrates a UI screen in which 4-Up printing is selected. As illustrated in FIG. 2, the user selects 4-Up printing. At this time, the print data generation unit 126 of the driver 120 generates a scaled-down logical page for each page. For each object, the coordinates of a print position and a size are changed according to a scaling-down rate. Software to execute scaling down is managed by a driver for the host-based type and by F/W for the PCL type.

For 4-Up printing, a print area is such that a total of 4 logical pages are reduced into a 1-page area, and the coordinates of a print position and the size of each object are changed accordingly. The print area is automatically determined by the driver according to top, bottom, left, and/or right spaces occupied by each of the logical pages.

Figure 3:
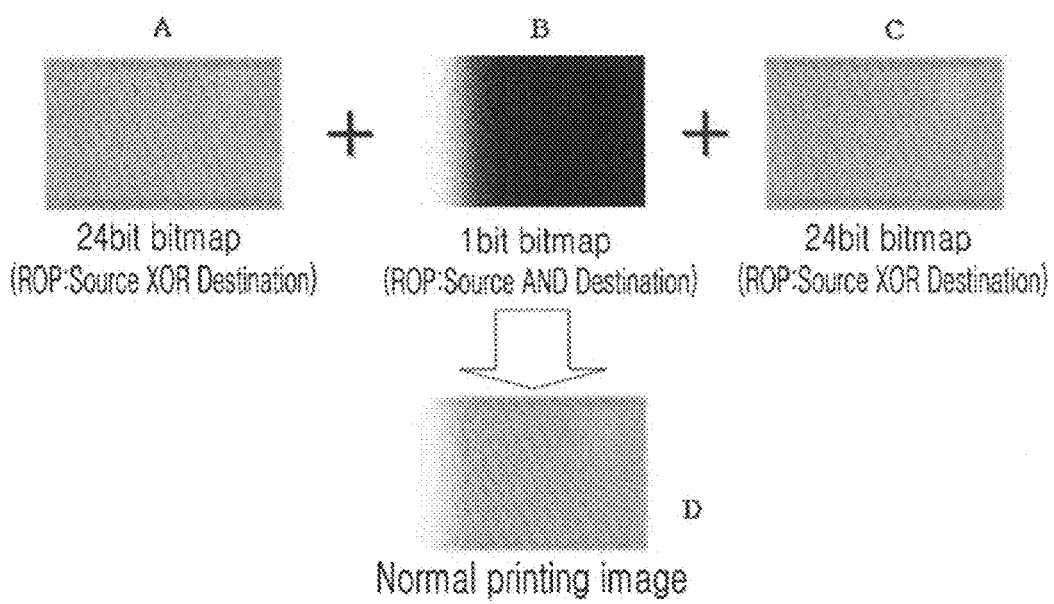
FIG. 3 illustrates a normal printing result.

FIG. 3 illustrates a normal printing result. When a data file, which is likely to have a problem in scaled-down printing, is printed without selection of a special option, a printing result as indicated by D of FIG. 3 is obtained. More specifically, upon printing of a slide, the GDI 110 transmits bitmap objects to the DDI 122 three times. In FIG. 3, a bitmap object A is initially transmitted to the DDI 122, a bitmap object B is then transmitted to the DDI 122, and a bitmap object C is finally transmitted to the DDI 122.

In FIG. 3, the bitmap object A includes a raster operation (ROP) code of an exclusive OR (XOR) as its component, the bitmap object B includes an AND ROP, and the bitmap object C includes an XOR ROP. These 3 bitmap objects transmitted to the same print position form a final print image D under the influence of an ROP of each of the bitmap objects.

The printing result D illustrated in FIG. 3, although not an issue in the case of normal printing (100% printing), may have a problem when the user selects an option associated with scaled-down printing. That is, for scaled-down printing, the user selects a particular option in the UI 124 of the driver 120. A scaling-down rate is determined in the driver 120 according to the selected option, and each object is scaled down according to the determined scaling-down rate and then printed. However, a scaled-down printing result of a bitmap object may include a distortion depending on a bitmap shape regardless of a scaling-down rate.

Figure 4:
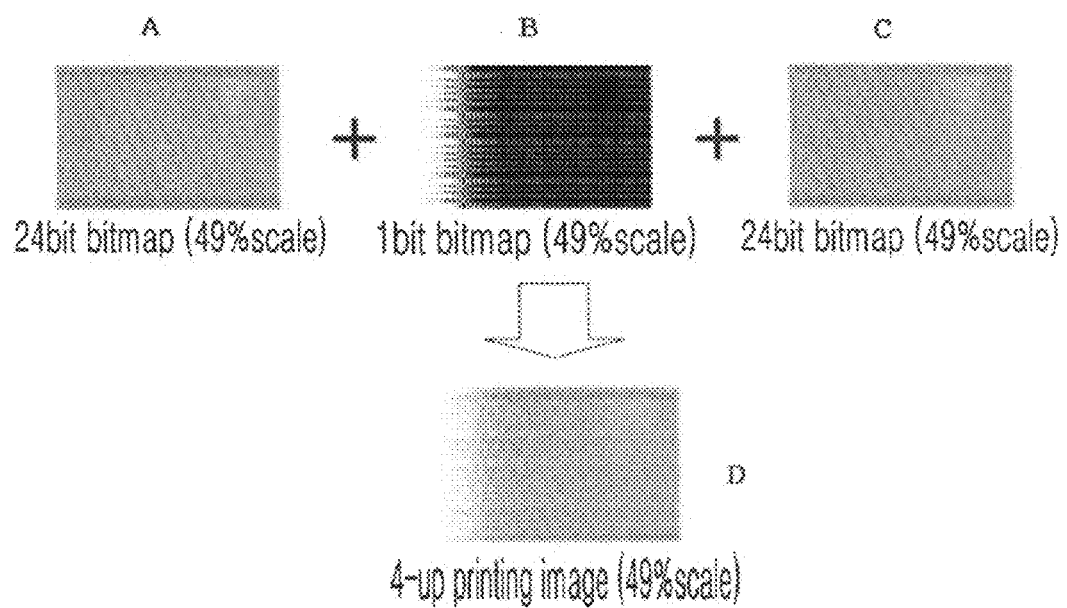
FIG. 4 illustrates an example of 4-Up scaled-down (or size-reduced) printing.

FIG. 4 illustrates an example of 4-Up scaled-down printing. In spite of 4-Up printing, attributes of an object transmitted by the GDI 110 do not change. For 4-Up printing, bitmap objects are transmitted three times in the same order and with the same attributes as in normal printing (as described above with reference to FIG. 3). The driver 120 calculates a scaling-down rate based on a 4-Up printing option. The print data generation unit 126 scales down a bitmap object for a host-based type driver and the F/W scales down a bitmap object for a PCL type driver. FIG. 4 illustrates a scaled-down image of each object to be transmitted.

A data scaling-down unit reads a scaling-down rate upon transmission of each object to perform scaling down at the read scaling-down rate, and stores the scaling-down result in a memory (i.e., an entire page memory). As an example, if a bitmap object B transmitted second is scaled down at a scaling-down rate of 49%, the bitmap object B is distorted as indicated by D of FIG. 4. Since the bitmap object B is in the same position as a scaling-down result of a bitmap object A, an AND ROP is applied to the bitmap object B. Then, the bitmap object B is scaled down to generate a scaled-down bitmap object C. An XOR ROP is applied to the scaled-down bitmap object C, thereby obtaining the distorted printing result as indicated by D.

Figure 5:
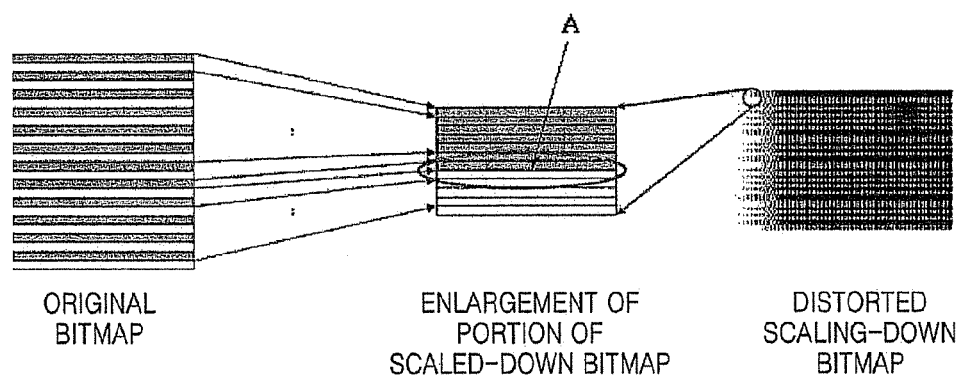
FIG. 5 illustrates an example of a scaling-down distortion.

FIG. 5 illustrates an example of a scaling-down distortion. Referring to FIG. 5, an enlargement of a portion of a distorted scaled-down bitmap in a right side of FIG. 5 is a scaled-down bitmap at the center of FIG. 5. As can be seen, when an original bitmap in a left side of FIG. 5 is scaled down, a distorted bitmap depending on a scaling-down rate is generated as shown in the center of FIG. 5.

As an example, the original bitmap in the left side of FIG. 5 is scaled down at a scaling-down rate of 49%. General scaling down involves generating a scaled-down bitmap by selecting pixels according to a scaling-down rate at which the original bitmap is scaled down. Referring to FIG. 5, if the original bitmap includes alternations of black and white line-by-line, after 49% scaling-down printing, the distorted scaled-down bitmap is generated as shown in the center of FIG. 5. According to a scaling-down method, software initially selects only black lines. Once the black lines exceed a predetermined size based on a scaling-down rate of 49%, the software then selects only white lines.

In FIG. 5, A represents a point where line selections overlap. After the point A, only white lines are selected in contrast to the selection of only black lines made prior to the point A. As a result, the final scaled-down bitmap is distorted as shown in the right side of FIG. 5. In addition, there is a possibility at all times that a scaled-down shape may be distorted according to an original shape and a scaling-down rate.

Figure 6:
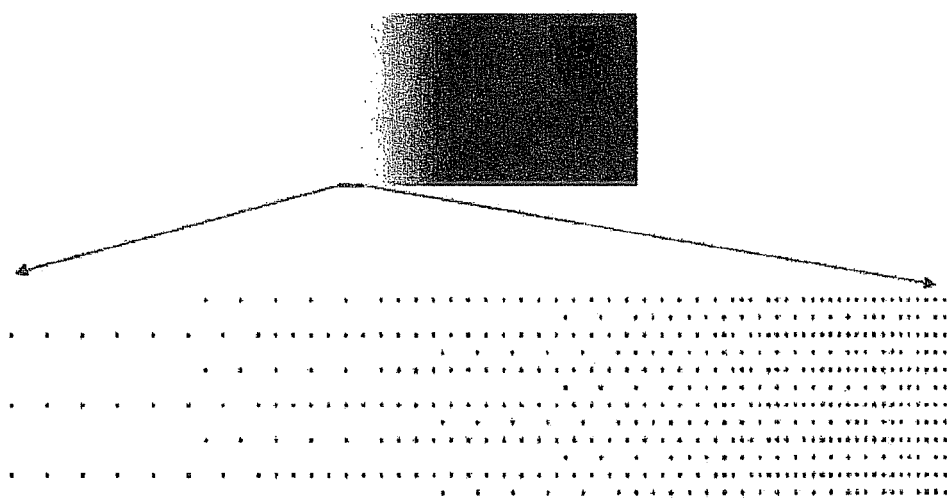
FIG. 6 illustrates an enlargement of a portion of a bitmap object in which a distortion occurs during printing.

FIG. 6 illustrates an enlargement of a portion of the bitmap object B of FIG. 3 in which a distortion occurs during printing. As can be seen from the enlargement, the bitmap object B appears to be a pattern. This shape of bitmap object is transmitted from the GDI 110 to the driver 120. At this time, if the user selects scaled-down printing, the bitmap object may be distorted according to a scaling-down rate as shown in the right side of FIG. 5. Moreover, if the bitmap object is shaped like a pattern having a predetermined rule therein, a scaled-down printing result of the bitmap object is quite different from the original bitmap object according to a scaling-down rate.

Figure 7:
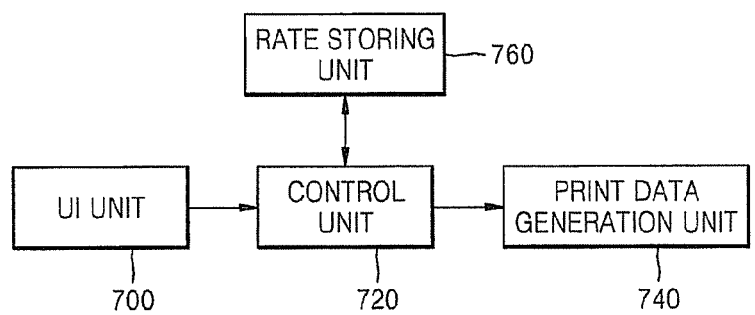
FIG. 7 is a block diagram of a host device that controls scaled-down printing performed by an image forming apparatus according to an embodiment of the present invention.

FIG. 7 is a block diagram of a host device that controls scaled-down printing performed by an image forming apparatus according to an embodiment of the present invention. Referring to FIG. 7, the host device includes a UI unit 700, a control unit 720, a print data generation unit 740, and a rate storing unit 760.

The UI unit 700 includes a scaling-down mode input unit through which a scaling-down mode of a print document is input and a scaling-down rate fine-adjustment input unit through which scaling-down fine adjustment to finely adjust a preset scaling-down rate is input if the scaling-down mode is input through the scaling-down mode input unit. The scaled-down printing may include an N-Up printing to print several pages on a single sheet, Fit-to-Page printing to print a print image to fit a print medium size, and/or Scaled-Up/Down printing. Moreover, the UI unit 700 may display a preset scaling-down rate in advance before displaying a fine-adjusted scaling-down rate obtained by finely adjusting the preset scaling down rate, though aspects of the present invention are not limited thereto. For the input of the scaling-down rate fine adjustment, the user may directly input a desired scaling-down rate or may adjust the preset scaling-down rate using a slide bar.

Once the scaling-down mode is input through the scaling-down mode input unit of the UI unit 700 and the scaling-down rate is finely adjusted for the scaling-down mode through the scaling-down rate fine adjustment input unit of the UI unit 700, the control unit 720 applies a new scaling down rate to a print document according to the scaling-down rate fine adjustment. At this time, the control unit 720 may display a recommended value for the scaling-down rate fine adjustment corresponding to the scaling-down mode in order to allow the user to select or to input the recommended value. The input of the scaling-down rate fine adjustment may be performed by adjusting a value below a decimal point of a scaling-down rate.

The print data generation unit 740 generates print data according to the applied scaling-down rate and transmits the generated print data to the image forming apparatus.

The rate storing unit 760 stores the preset rate and a rate corresponding to the scaling-down rate fine adjustment that is input through the UI unit 700. Upon input of the scaling-down rate fine adjustment through the UI unit 700, the control unit 720 reads the rate storing unit 760 to obtain the rate corresponding to the input scaling-down rate fine adjustment as a new scaling-down rate. The print data generation unit 740 scales down an image at the new scaling-down rate to generate print data of the scaled-down image, and transmits the generated print data.

Although not limited thereto, the control unit 720 may be implemented with software. In this case, the software to generate print data may automatically calculate a new scaling-down rate according to a user-selected fine adjustment value. Moreover, the software may generate a rate database corresponding to an original scaling-down rate, store the rate database, and, upon input of a scaling-down rate and a fine adjustment amount, read a previously stored rate corresponding to the input scaling-down rate or mode from the rate database for use as a new scaling-down rate.

Figure 8:
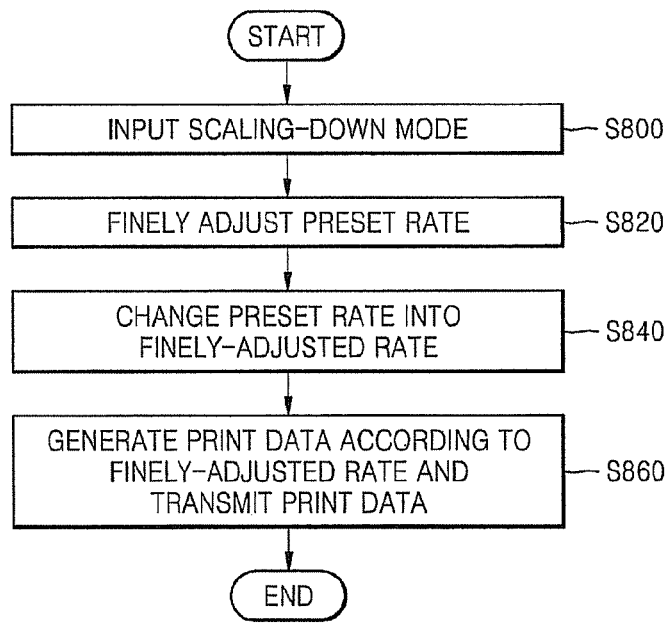
FIG. 8 is a flowchart illustrating a method of controlling scaled-down printing for a host device according to an embodiment of the present invention.

FIG. 8 is a flowchart illustrating a method of controlling scaled-down printing for a host device according to an embodiment of the present invention. N-Up printing to print a plurality of pages of a print document on a single sheet, Fit-to-Page printing to print the print document to fit to a print medium size, or Scaled-Up/Down printing for scaled-up/down printing of the print document is selected through the scaling-down mode input unit of the UI unit 700 in operation S800. At this time, a recommended value for scaling-down rate fine adjustment corresponding to a scaling-down mode may be displayed, though aspects of the present invention are not limited thereto. That is, according to other aspects, no such recommended value is displayed. A preset scaling-down rate is finely adjusted for the input scaling-down mode (operation S800) through the scaling-down rate fine adjustment input unit of the UI unit 700 in operation S820. For the scaling-down rate fine adjustment, the user may directly input a desired scaling-down rate in place of the preset scaling-down rate or may adjust a value below a decimal point of the preset scaling-down rate. The UI unit 700 may be a UI of a printer driver or a UI of an application.

According to the fine adjustment (operation S820), the preset scaling-down rate is changed into the finely-adjusted scaling-down rate in operation S840. The preset scaling-down rate may be dynamically changed as the fine adjustment is being performed in operation S820, or may be changed upon completion of the fine adjustment in operation S820. An image is scaled down according to the finely-adjusted scaling-down rate to generate print data and the print data is transmitted to an image forming apparatus in operation S860. In order to generate the print data of the scaled-down image, F/W in the image forming apparatus may perform scaling-down or a driver of a host-based image forming apparatus may scale down an entire page image.

Figure 9:
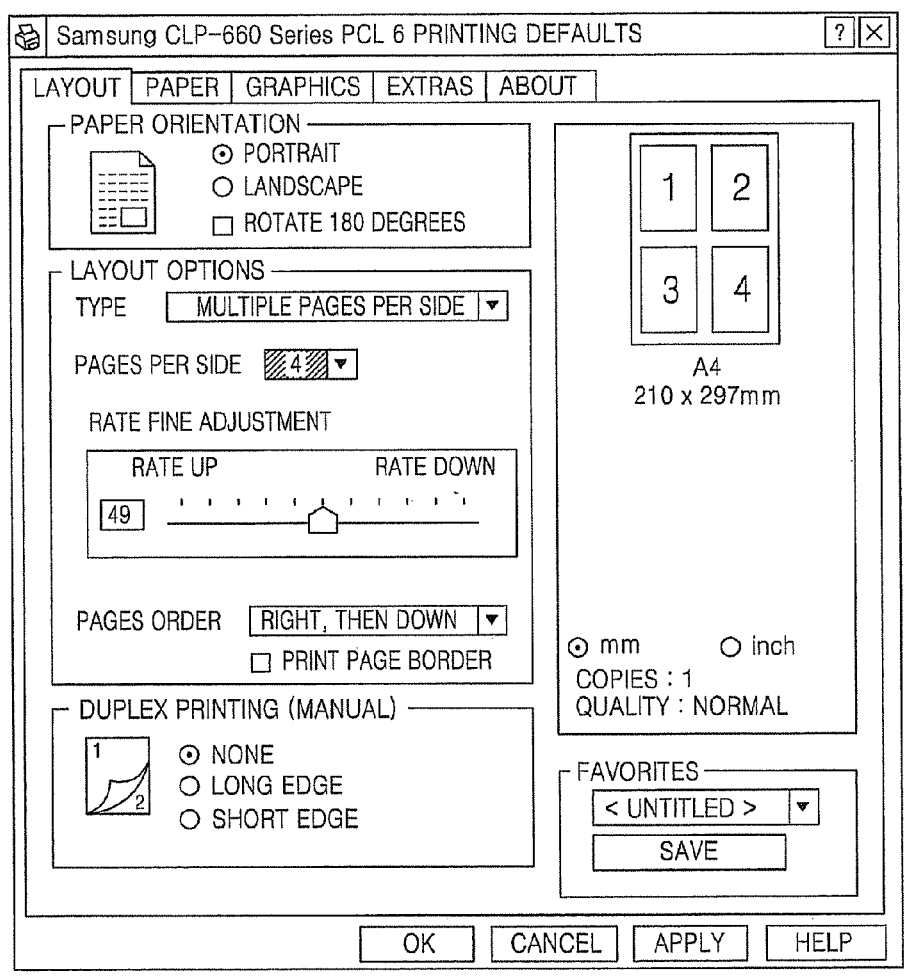
FIG. 9 illustrates an example of a UI unit according to an embodiment of the present invention.

FIG. 9 illustrates an example of the UI unit 700 that includes a scaling-down rate fine-adjustment input unit. For example, N-Up printing generally provides an operation of printing 1, 2, 4, 6, 9, or 16 pages on a single physical page of print medium. To compensate for a distortion of the print job, N-Up printing provides an operation of finely adjusting a scaling-down rate according to aspects of the present invention.

When an additional operation associated with rate adjustment is selected, a rate used for a currently set additional operation is displayed in advance on a rate fine-adjustment menu (such as a slide bar) in order to allow a user to reduce (Down) or increase (Up) the rate, thereby providing convenience to the user.

For example, in the case of A4, rates used for N-Up printing are as shown in Table 1. Although Table 1 shows rates for N-Up printing, rates may also be displayed for Scaled-Up/Down printing and Fit-to-Page printing.

TABLE 1

|  | Print without page border | Print page border |
| --- | --- | --- |
| 2-Up | 0.684591 | 0.635691 |
| 4-Up | 0.490000 | 0.455000 |
| 6-Up | 0.342295 | 0.317846 |
| 9-Up | 0.326667 | 0.303333 |
| 16-Up | 0.245000 | 0.227500 |

The rates as shown in Table 1 may be displayed on the UI of the driver for user convenience and the user may adjust a rate by using a slide bar. The adjusted rate is displayed as a number on a box located to the left of the slide bar and a range of adjustment is arbitrarily set at the release of the driver. If the rate is adjusted excessively, an intended printing result may not be obtained. Accordingly, the range of adjustment may be set from −2.5% to +2.5%.

Since patterns vary with application program or vary on a printing-by-printing basis even for the same application program, it is difficult to obtain an optimized rate in advance. Although a preset rate in a driver is available in some aspects of the present invention, a UI to allow the user to directly adjust the rate may also (or alternatively) be provided.

When an additional operation including scaled printing is selected at the time of printing, the user may be notified that an intended printing result may not be obtained according to a pattern so that the user can use a rate fine-adjustment operation.

Figure 10:
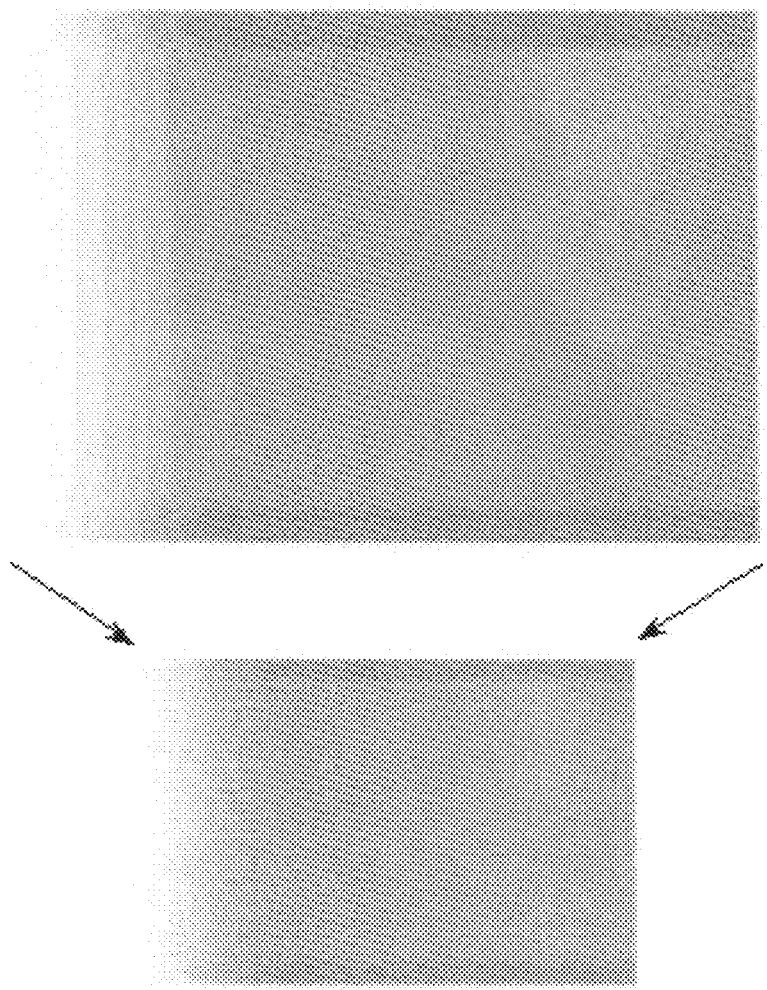
FIG. 10 illustrates an example of improved scaled-down printing according to an embodiment of the present invention.

A final printing result changes with even a minor change of a scaling-down rate according to a form of a bitmap. FIG. 10 illustrates an example of improved scaled-down printing. In FIG. 10, a scaling-down rate for 4-Up printing is reduced by 1%. That is, while 4-Up printing is performed at a scaling-down rate of 49% in FIG. 4, 4-Up printing is performed at a scaling-down rate of 48% in FIG. 10.

For a range of rate fine-adjustment, a range to include a value below a decimal point to prevent excessive change of an image size (e.g., a range from −2% to +2%) may be provided, though this range may also be changed. For N-Up printing in FIG. 9, logical page areas may overlap if a currently set rate is increased. Therefore, a range of fine-adjustment value may be limited to below 0. As such, the range of fine adjustment can be changed according to a software developer's intention or the purpose of a user-selected special option. For example, if the range of fine adjustment is maintained between −1% and +1%, a maximum error from an actually set rate, although differing according to the print medium size, may be, for example, 2.1 mm (wide) and 2.7 mm (long) in the case of A4, and this error would be increased if the range of fine adjustment is widened. In scaled-down printing, this error may be satisfactory to the user.

Figure 11:
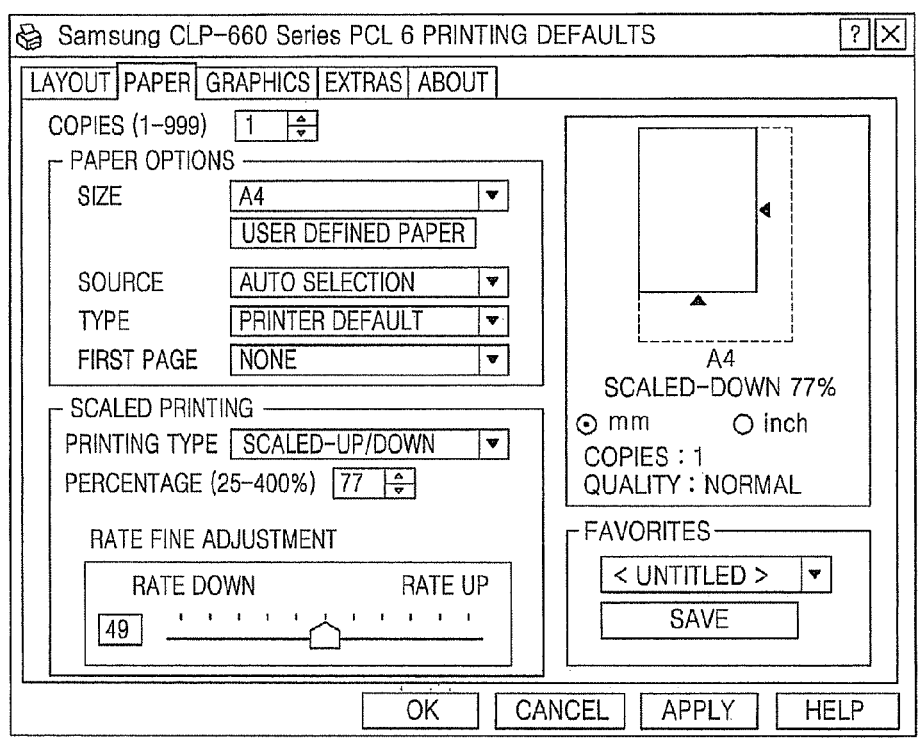
FIGS. 11 and 12 illustrate modified examples of a UI unit according other embodiments of the present invention.
Figure 12:
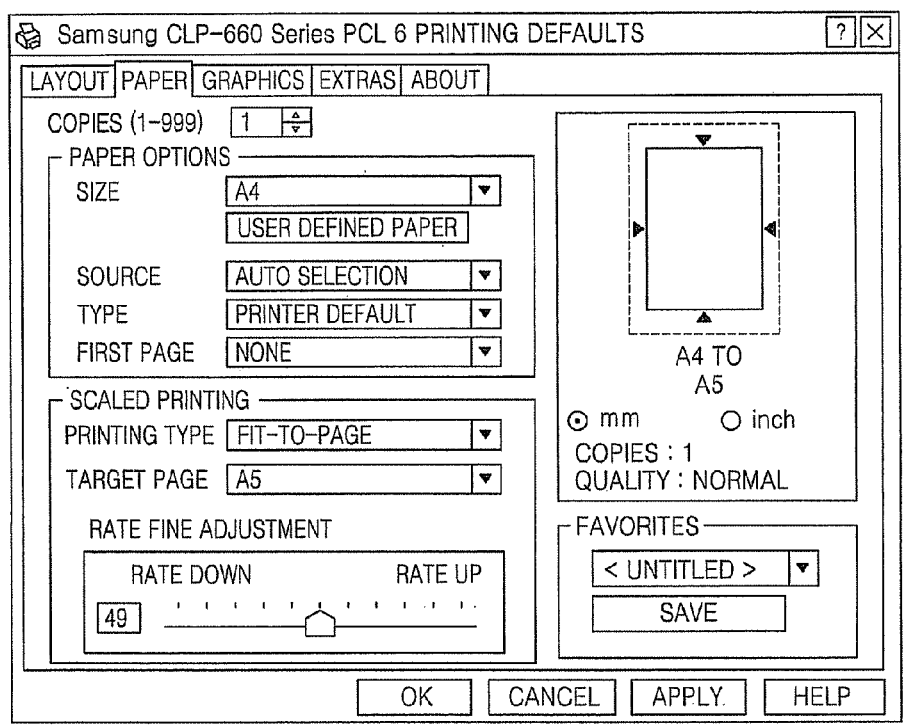

It is understood that the UI unit 700 according to the foregoing description may be modified in a variety of ways. For example, a rate can be finely adjusted even in other additional operations, provided by a printer driver, where scaled-down printing is performed. FIGS. 11 and 12 illustrate modified examples of the UI unit 700 according to other embodiments of the present invention.

Furthermore, it is understood that, according to other aspects, the user may be allowed to directly input precise figures to a reference rate.

As shown in FIG. 10, a print result is improved when compared to that obtained by a conventional technique of scaled printing. In a printing device without such an operation, the user cannot obtain a print result that is nearly identical to an original image by compensating for distortion of a scaled-down printed image. As such, according to aspects of the present invention, the user is provided with the convenience of obtaining a print result that is nearly identical to an original image by avoiding distortion of the scaled-down print result.

While N-Up printing, Fit-to-Page printing, and Scaled-Up/Down printing are provided as examples of scaling modes in the above description, it is understood that aspects of the present invention are not limited thereto. That is, aspects of the present invention may also be applied to other scaling modes. Furthermore, while the host device is provided in the above-described embodiments to receive the scaling-down inputs, it is understood that aspects of the present invention are not limited thereto. For example, the image forming apparatus itself can receive the scaling-down inputs and generate the new scaling-down rate.

Aspects of the present invention can also be embodied on a computer-readable recording medium as a code that can be read by a computer (including any device having an information processing operation). The computer-readable recording medium is any data storage device that can store data which can thereafter be read by a computer system. Examples of computer-readable recording media include read-only memory (ROM), random-access memory (RAM), CD-ROMs, magnetic tapes, floppy disks, and optical data storage devices. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling scaled-down printing for a host device connected with an image forming apparatus that prints a print document, the method comprising:
inputting a scaling-down mode for the print document through a user interface (UI) of the host device;
inputting a scaling-down rate fine adjustment for the scaling-down mode to generate a new scaling-down rate; and
applying the new scaling-down rate to the print document,
wherein the scaling-down rate fine adjustment compensates for a distortion caused by consecutively selecting and deleting pixel lines having identical pixel value from among a plurality of pixel lines of a bit map of the print document in the input scaling-down mode; and
wherein the inputting the scaling-down rate fine adjustment comprises generating the new scaling-down rate such that pixel lines having different pixel values are uniformly selected and deleted from the plurality of pixel lines of the bit map.

2. The method as claimed in claim 1, further comprising:
generating print data corresponding to the print document according to the applied new scaling-down rate and transmitting the generated print data to the image forming apparatus.

3. The method as claimed in claim 1, wherein the scaling-down mode is an N-Up printing, a Scaled-Up/Down printing, or a Fit-to-Page printing.

4. The method as claimed in claim 1, wherein the inputting of the scaling-down rate fine adjustment comprises:
displaying a preset scaling-down rate; and
changing the displayed preset scaling-down rate into a finely adjusted scaling-down rate, corresponding to the new scaling-down rate, according to the input scaling-down rate fine adjustment.

5. The method as claimed in claim 4, wherein the scaling-down rate fine adjustment is input by a user's direct input to the preset scaling-down rate or by a user's adjustment of a slide bar.

6. The method as claimed in claim 4, further comprising:
displaying a recommended value for the scaling-down rate fine adjustment corresponding to the input scaling-down mode.

7. The method as claimed in claim 4, wherein the scaling-down rate fine adjustment is input by adjusting a value below a decimal point of the preset scaling-down rate.

8. The method as claimed in claim 1, wherein the UI is a UI of a printer driver and/or a UI of an application.

9. The method as claimed in claim 1, wherein the inputting of the scaling-down mode comprises:
   displaying a plurality of scaling-down modes through the UI; and
   receiving a user selection of the scaling down mode from among the plurality of scaling-down modes.

10. The method as claimed in claim 1, wherein the inputting of the scaling-down rate fine adjustment comprises restricting the scaling-down rate fine adjustment to a predetermined range of adjustment.

11. The method as claimed in claim 1, wherein the image forming apparatus applies the new scaling-down rate to the print document.

12. A host device connected with an image forming apparatus that performs scaled-down printing on a print document, the host device comprising:
   a user interface (UI) unit comprising a scaling-down mode input unit through which a scaling-down mode for the print document is input, and a scaling-down rate fine adjustment input unit through which a scaling-down rate fine adjustment to finely adjust a preset rate of the input scaling down mode is input; and
   a control unit to generate a new scaling-down rate from the preset rate and the input scaling-down rate fine adjustment, and to apply the new scaling-down rate to the print document,
   wherein the scaling-down rate fine adjustment compensates for a distortion caused by consecutively selecting and deleting pixel lines having identical pixel value from among a plurality of pixel lines of a bit map of the print document in the input scaling-down mode; and
   wherein the control unit generates the new scaling-down rate such that pixel lines having different pixel values are uniformly selected and deleted from the plurality of pixel lines of the bit map.

13. The host device as claimed in claim 12, further comprising:
   a print data generation unit to generate print data corresponding to the print document according to the applied new scaling-down rate and to transmit the generated print data to the image forming apparatus.

14. The host device as claimed in claim 12, wherein the scaling-down mode is an N-Up printing, a Scaled-Up/Down printing, or a Fit-to-Page printing.

15. The host device as claimed in claim 12, wherein the UI unit displays a rate and the control unit changes the displayed recommended rate into a finely adjusted scaling-down rate, corresponding to the new scaling-down rate, according to the input scaling-down rate fine adjustment.

16. The host device as claimed in claim 15, wherein the scaling-down rate fine adjustment is input by a user's direct input to the preset scaling-down rate or by a user's adjustment of a displayed slide bar.

17. The host device as claimed in claim 15, wherein the UI unit displays a recommended value for the scaling-down rate fine adjustment corresponding to the input scaling-down mode.

18. The host device as claimed in claim 15, wherein the scaling-down rate fine adjustment is input by adjusting a value below a decimal point of the preset scaling-down rate.

19. The host device as claimed in claim 12, further comprising:
   a rate storing unit to store the preset rate and a rate corresponding to the scaling-down rate fine adjustment that is input through the UI unit,
   wherein the control unit reads the rate storing unit to generate the rate corresponding to the scaling-down rate fine adjustment as the new scaling-down rate.

* * * * *

UNITED STATES PATENT AND TRADEMARK OFFICE
CERTIFICATE OF CORRECTION

| | | |
|---|---|---|
| PATENT NO. | : 8,467,086 B2 | Page 1 of 1 |
| APPLICATION NO. | : 12/539042 | |
| DATED | : June 18, 2013 | |
| INVENTOR(S) | : Sung-myun Lee et al. | |

It is certified that error appears in the above-identified patent and that said Letters Patent is hereby corrected as shown below:

On the Title Page, Item (54) and in the Specification, Column 1, Line 2, (Title), Delete "HOSE" and insert -- HOST --, therefor.

Signed and Sealed this
Eighth Day of October, 2013

Teresa Stanek Rea
*Deputy Director of the United States Patent and Trademark Office*